(12) United States Patent
Baughman et al.

(10) Patent No.: US 11,012,662 B1
(45) Date of Patent: May 18, 2021

(54) MULTIMEDIA CONTENT ADJUSTMENT USING COMPARABLE CONTENT

(71) Applicant: International Business Machines Corporation, Armonk, NY (US)

(72) Inventors: Aaron K. Baughman, Cary, NC (US); Stephen C. Hammer, Marietta, GA (US); Gray Cannon, Miami, FL (US); Shikhar Kwatra, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/827,904

(22) Filed: Mar. 24, 2020

(51) Int. Cl.
*H04N 7/01* (2006.01)
*H04N 5/04* (2006.01)

(52) U.S. Cl.
CPC ............. *H04N 7/0127* (2013.01); *H04N 5/04* (2013.01)

(58) Field of Classification Search
CPC ............................... H04N 7/0127; H04N 5/04
See application file for complete search history.

(56) References Cited

U.S. PATENT DOCUMENTS

| | | | |
|---|---|---|---|
| 7,263,671 B2 | 8/2007 | Hull et al. | |
| 7,356,470 B2 | 4/2008 | Roth et al. | |
| 9,330,171 B1 | 5/2016 | Shetty et al. | |
| 9,524,751 B2 | 12/2016 | Oz et al. | |
| 9,659,313 B2 | 5/2017 | Tsai et al. | |
| 10,049,477 B1* | 8/2018 | Kokemohr | ............. G06T 11/60 |
| 10,380,428 B2 | 8/2019 | Shekhar et al. | |
| 2002/0078158 A1 | 6/2002 | Brown et al. | |
| 2017/0118383 A1* | 4/2017 | Bollman | ................ H04N 5/91 |
| 2018/0357562 A1* | 12/2018 | Hofman | ............... G06N 5/022 |
| 2020/0090033 A1* | 3/2020 | Ramachandran | ........ G06N 3/08 |

OTHER PUBLICATIONS

Tian et al., "Audio-Visual Event Localization in Unconstrained Videos", In Proceedings of the European Conference on Computer Vision (ECCV), Mar. 23, 2018.
Van Den Oord et al., "WaveNet: A Generative Model for Raw Audio", arXiv preprint arXiv:1609.03499, Sep. 2016.

(Continued)

*Primary Examiner* — Michael E Teitelbaum
(74) *Attorney, Agent, or Firm* — Garg Law Firm, PLLC; Rakesh Garg; Michael O'Keefe

(57) ABSTRACT

An adjustment specification specifies the adjustment to be made to a multimedia content, including a time characteristic. The multimedia content is matched within a tolerance to a set of comparable multimedia contents having a characteristic corresponding to the adjustment specification. An embedding model is configured and trained. Using the trained embedding model and the set of comparable multimedia contents, a set of styles is generated. Using a frame adjustment model and a style in the set of styles, a video frame of the multimedia content is adjusted. Using an audio adjustment model and the trained embedding model, an audio portion of the multimedia content is adjusted. The video frame of the multimedia content and the audio portion of the multimedia content are synchronized, producing an adjusted multimedia content adjusted according to the adjustment characteristic.

20 Claims, 13 Drawing Sheets

(56) References Cited

OTHER PUBLICATIONS

Zhou et al., "Visual to Sound: Generating Natural Sound for Videos in the Wild", In Proceedings of the IEEE Conference on Computer Vision and Pattern Recognition, Jun. 1, 2018.
Vincent, "New AI research makes it easier to create fake footage of someone speaking", The Verge, Jul. 12, 2017, https://www.theverge.com/2017/7/12/15957844/ai-fake-video-audio-speech-obama.
Nield, "This Never-Ending Livestream of AI-Generated Death Metal is Giving Us Serious Anxiety", Apr. 24, 2019 https://www.sciencealert.com/new-24-7-ai-generated-death-metal-youtube-stream-is-giving-us-anxiety.
Hopper, Pandora—design and use of a multimedia system, IEE Colloquium on Multimedia Communications and Applications, 1991, https://ieeexplore.ieee.org/document/297357.
Heni et al., "A Neural Principal Component Analysis for text based documents keywords extraction", 2011 3rd International Conference on Next Generation Networks and Services (NGNS), Dec. 2011, pp. 112-115.
Sun et al., "A method of Text Event Detection and Image Enhancement based on Aerial Video", IEEE International Symposium on Industrial Electronics (ISIE 2009), Seoul Olympic Parktel, Seoul, Korea Jul. 5-8, 2009, pp. 307-310.
Talukder et al., "Connected Component Based Approach for Text Extraction from Color Image", 2014 17th International Conference on Computer and Information Technology (ICCIT), 2014, pp. 204-209.
Balint et al., "Agent Script Generation using Descriptive Text Documents", MIG '14: Proceedings of the Seventh International Conference on Motion in Games, Nov. 2014.
Wu et al., "Editing Text in the Wild", MM '19: Proceedings of the 27th ACM International Conference on Multimedia, Oct. 21-25, 2019, Nice, France, pp. 1500-1508.
Carvalho et al., "LIWBC: a bigram algorithm to enhance results in polarity classification", WebMedia '18: Proceedings of the 24th Brazilian Symposium on Multimedia and the Web, Oct. 16-19, 2018, Salvador-BA, Brazil, pp. 419-422.
Segundo et al., "Crowdsourcing & Multimedia: Enhancing Multimedia Activities with the Power of Crowds", Webmedia '16: Proceedings of the 22nd Brazilian Symposium on Multimedia and the Web, Nov. 8-11, 2016, Teresina, PI, Brazil, pp. 11-12.

\* cited by examiner

MULTIMEDIA CONTENT ADJUSTMENT USING COMPARABLE CONTENT

BACKGROUND

The present invention relates generally to a method, system, and computer program product for multimedia content adjustment. More particularly, the present invention relates to a method, system, and computer program product for multimedia content adjustment using comparable content.

Multimedia content includes one or more of a still image or video component, an audio component, and a textual component. A text document, audio recording, presentation including a mixture of text and still images, silent movie (including text and video, but not audio), and conventional movie (including audio and video, with text captions) are all non-limiting examples of multimedia content.

Multimedia content has a format characteristic, which describes a format of the multimedia content. The number of pixels, number of colors, and dimensions of a still image, the bit rate of an audio recording, and the number of frames per second are all non-limiting examples of a format characteristic of multimedia content. For example, a television presentation produced in North America in the 1970s might have format characteristics including a 720×480 resolution and a frame rate of 30 frames per second.

Multimedia content also has a time characteristic, which describes a time period associated with the multimedia content. The time characteristic can be in the past. For example, a video and audio presentation explaining the preparation of computer systems for the transition from the years 1999 to 2000 might have a time characteristic of 1999, or a specific data within 1999. The time characteristic can also be in the future. For example, a video and audio presentation previewing next year's baseball season might have a time characteristic of next year, or a specific date next year before the season is to start. Multimedia content can also have more than one time characteristic. For example, an audio presentation produced in 1938 about an invasion of Earth by extraterrestrials on a future date might have two time characteristics: 1938 and the future date. The time characteristic can also be the present. For example, a contemporary drama, produced this year but not otherwise referencing a specific time period, has a time characteristic of the present.

Multimedia content also has a style characteristic, which describes a visual appearance associated with the multimedia content. A color scheme, particular set of textures, hue, and contrast ratio present in video or still images of multimedia content are all non-limiting examples of a style characteristic. For example, a video presentation of a home decorated in the 1970s might have style characteristics of a color scheme using mostly orange and brown color tones and textures including a shag carpet.

Multimedia content often has more than one type of characteristic. For example, a video presentation, produced in the 1970s, of a home decorated in the 1970s, might have a format characteristic of a 1970s television format, a time characteristic of the 1970s, and style characteristics of a color scheme using mostly orange and brown and textures including a shag carpet.

SUMMARY

The illustrative embodiments provide a method, system, and computer program product. An embodiment includes a method that loads into memory, as a part of adjusting a multimedia content, the multimedia content, wherein an adjustment specification specifies the adjustment, the adjustment comprising a time characteristic to which the multimedia content is to be adjusted. An embodiment matches, within a tolerance, the multimedia content to a set of comparable multimedia contents, a comparable multimedia content in the set of comparable multimedia contents having a characteristic corresponding to the adjustment specification. An embodiment configures an embedding model, the embedding model comprising a conversion of a unit of narrative text into a numerical representation, the conversion encoding a contextual relationship between two units of narrative text into a distance between corresponding numerical representations. An embodiment trains, using the set of comparable multimedia contents, the embedding model. An embodiment generates, as a result of executing a set of instructions in a processor, using the trained embedding model and the set of comparable multimedia contents, a set of styles, a style in the set of styles comprising a modified video frame, the modified video frame modified from a video frame in the set of comparable multimedia contents. An embodiment adjusts, using a frame adjustment model and a style in the set of styles, a video frame of the multimedia content. An embodiment adjusts, using an audio adjustment model and the trained embedding model, an audio portion of the multimedia content. An embodiment synchronizes the video frame of the multimedia content and the audio portion of the multimedia content, the synchronizing producing an adjusted multimedia content, the adjusted multimedia content adjusted according to the adjustment characteristic.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
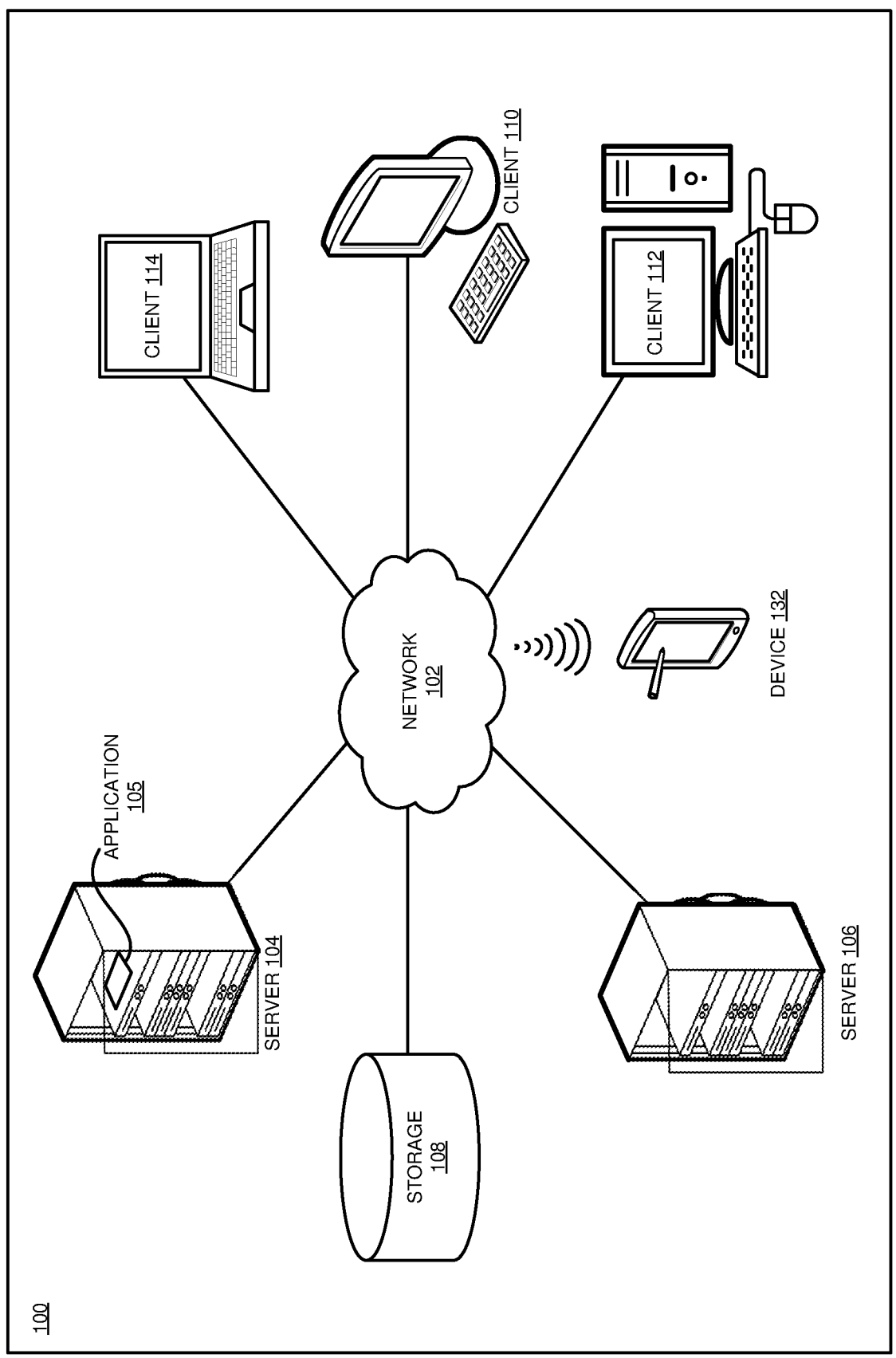
FIG. 1 depicts a block diagram of a network of data processing systems in which illustrative embodiments may be implemented.

The illustrative embodiments recognize that one or more characteristics of multimedia content might require adjustment. For example, a format characteristic of the content, such as the dimensions or frame rate, might need to be altered to display correctly on a user's device. As another example, video content with a time characteristic from before color film was available was originally produced in greyscale and often requires colorization to meet contemporary users' expectations. As a third example, assembling a collection of pieces of content, each with differing style characteristics, into an anthology often requires style normalization to present the appearance of a cohesive whole. For example, a set of still images, each originally produced with a different contrast ratio, color temperature, and other visual parameters, would be better presented as one cohesive presentation, with a common contrast ratio, color temperature, and other visual parameters. Similarly, a video presentation produced in 1970 and portraying a contemporary drama of the time might require adjustment to modernize the actors' clothing styles and slang phrases to be better received by a modern audience.

The illustrative embodiments also recognize that determining what adjustments are to be made often requires extensive research and the knowledge and skills of specialized historians, art directors and artists. For example, when colorizing video originally produced in greyscale, appropriate colors for elements of each scene must be determined. For example, the sky on a sunny day should not be portrayed using the same color as the sky on a cloudy day. Similarly, colors chosen for clothing should be appropriate both for a particular character (for example, a male character attending a formal ball in the 1960s would be unlikely to wear a pink jacket unless for a specific reason appropriate to the character) and the period (for example, clothing should not use colors that could not be produced using the dyes available in the period portrayed). Modernizing actors' clothing styles and slang phrases requires period-specific knowledge as well. The illustrative embodiments recognize that one source of the knowledge necessary to determine which adjustments to apply is comparable content to the multimedia content being adjusted.

The illustrative embodiments recognize that some adjustments involve only simple calculations. For example, altering the aspect ratio of a still image or video frame or altering the resolution of an audio portion or still image require only simple transformations, upscaling, or downscaling, using techniques that are presently available in an automated form suitable for execution on a computer system.

However, other adjustments currently require human intervention even after deciding which adjustments should be made. For example, one presently-available process for colorizing video originally produced in greyscale requires a human to apply the selected colors to at least some frames within a scene individually before an automated process transfers the selected colors to other frames of the scene. Similarly, modernizing actors' clothing styles and slang phrases requires a manual process to apply the updates to at least some frames of the original source. Thus, the illustrative embodiments recognize that there is an unmet need for an automatic method of determining what adjustments are appropriate, and then applying those adjustments.

The illustrative embodiments recognize that the presently available tools or solutions do not address these needs or provide adequate solutions for these needs. The illustrative embodiments used to describe the invention generally address and solve the above-described problems and other problems related to multimedia content adjustment using comparable content.

An embodiment can be implemented as a software application. The application implementing an embodiment can be configured as a modification of an existing multimedia composition system, as a separate application that operates in conjunction with an existing multimedia composition system, a standalone application, or some combination thereof.

Particularly, some illustrative embodiments provide a method that receives multimedia content to adjust. An adjustment specification specifies an adjustment to be made to the content. An embodiment matches, within a tolerance, the multimedia content to a set of comparable media contents having a characteristic corresponding to the adjustment specification. An embodiment uses the set of comparable media contents to configure and train an embedding model, uses the trained embedding model to generate a set of styles, adjust audio and video frames of the multimedia content using the trained embedding model and set of styles, and synchronize the adjusted audio and video to produce multimedia content adjusted according to the adjustment characteristic.

An embodiment receives multimedia content to be adjusted and loads the multimedia content into memory. The multimedia content includes one or more of a still image or video component, an audio component, and a textual component.

An embodiment also maintains a technical profile corresponding to the user. The technical profile includes information about characteristics of a device intended to present the adjusted multimedia content. Some non-limiting examples of information included in the technical profile include a type, dimensions, and resolution of the screen used to display still pictures or video, the number and capabilities of the speakers used to play audio, and the storage size, memory size, and processing speed of the device intended to present the adjusted multimedia content. An embodiment encodes the technical profile into a vector. A vector is a numerical representation of an object, in the form of an ordered set of coordinates in a multidimensional vector space. In one embodiment, each vector component is a floating point number between zero and 1.

An embodiment also maintains preference information corresponding to the user. Some non-limiting examples of preference information include a user's color preferences, geographical location, content adjustment history, content consumption history, and types of content adjustments that are allowed to be performed for a particular user or group of users.

Along with the multimedia content, an embodiment receives a query from a user and converts the query to an adjustment specification specifying an adjustment to be made to the content. One embodiment provides a user interface with which a user constructs a standardized form of a query which the embodiment converts to an adjustment specification. For example, one component of the user interface might allow a user to specify a filename for an input video, and another component of the user interface might allow the user to specify that the video should be colorized. In another embodiment, a user supplies the query in natural language form, and the embodiment uses one or more presently-available natural language processing or natural language understanding techniques to convert the natural language of the query to an adjustment specification. For example, a user might supply natural language text such as "colorize GrandparentsWeddingVideo", and the embodiment converts the text to a corresponding adjustment specification. Another embodiment does not require a query, and instead determines an adjustment by analyzing multimedia content. For example, an embodiment analyzes a multimedia content, determines that the content is video frames in greyscale, that the user's technical profile includes a system capable of displaying color video, and that the user's preference information indicates that the user has previously colorized other video content, and constructs an adjustment specification specifying that this content should be colorized as well.

In an embodiment, the adjustment specification includes a time characteristic to which the multimedia content is to be adjusted. In embodiments, the time characteristic specifies a date or range of dates, and can be in the past, present, or future. Thus, non-limiting examples of time characteristics are Jan. 1, 1970, the 1970s, the present, and ten years from now. In one embodiment, if a user does not explicitly specify a time characteristic or information that is convertible to an explicit time characteristic, an embodiment uses a range of dates including the present as the default time characteristic.

In an embodiment, the adjustment specification includes a format characteristic to which the multimedia content is to be adjusted. For example, an input multimedia content might be a television presentation produced in North America in the 1970s with format characteristics including a 720×480 resolution and a frame rate of 30 frames per second. Thus, a format characteristic of an adjustment specification for this content might be to convert the content to a 3840×2160 resolution and a 60 frame per second frame rate, suitable for display on an Ultra High Definition Television (UHDTV) display.

In an embodiment, the adjustment specification includes a style characteristic to which the multimedia content is to be adjusted. For example, an input multimedia content might have a color scheme using mostly orange and brown color tones. Thus, a style characteristic of an adjustment specification for this content might be to adjust the color scheme to mostly blue and green color tones.

An embodiment identifies a set of comparable multimedia content. Content in the set of comparable multimedia content has a characteristic that matches, within a tolerance, a characteristic of the adjustment specification of the input multimedia content to be adjusted. Using the set of comparable content provides an embodiment with examples of the results of content adjustments. For example, if a style characteristic of an adjustment specification is to adjust the content's color scheme to mostly blue and green color tones, comparable content would also have mostly blue and green color tones. As another example, if a time characteristic of an adjustment specification is to adjust the content to the 1970s, comparable content would also have a time characteristic of the 1970s. As a third example, an adjustment specification for colorizing video content from the 1930s might include a time characteristic of the 1930s and a style characteristic including a color spectrum. Comparable content would have similar characteristics—for example, including a full-color movie set in the 1930s.

An embodiment obtains the comparable content from any available source. One embodiment includes a stored library of content for use as comparable content. Another embodiment searches external sources accessible via a network such as the Internet for comparable content. Another embodiment obtains comparable content from another source or using another presently-available technique.

An embodiment generates a textual summary of a piece of comparable content. The textual summary summarizes, in words, the subject of the content. To generate the textual summary, an embodiment uses any presently-available content summarization technique. For example, a textual summary of video content can be generated using an unsupervised or supervised learning technique, using criteria such as relevance, diversity, and representativeness to select important frames from the video content, using a video captioning technique to describe video content with natural language, or using a combination of techniques. Similar techniques are also available for generating textual summaries of audio content. In addition, techniques are also presently available to summarize a narrative text document into a shorter summary.

An embodiment configures and trains an embedding model, or configures an already-trained embedding model for use. An embedding model takes as its input a corpus of narrative text and produces a vector space, typically of several hundred dimensions, with each unique word, phrase, or other unit of narrative text in the corpus being assigned a corresponding vector in the space. Vectors are positioned in the vector space such that words that share common contexts in the corpus are located close to one another in the space. This spatial relationship between vectors allows a numerical model, such as a neural network, to learn and manipulate narrative text while taking textual context into account. One non-limiting example of a configuration for an embedding model is a two-layer neural network. Other embedding model configurations are also possible and contemplated within the scope of the illustrative embodiments.

Embedding models that already trained on a contemporary corpus of text are presently available. However, if a time characteristic of an adjustment specification is not the present day, a model trained on contemporary text is not necessarily appropriate to that time characteristic. For example, word usage, slang terms, and even the meaning of words changes over time, and new words are invented to describe new inventions. Thus, an embodiment adjusts a training corpus to conform to the time characteristic, then uses the adjusted training corpus to train the embedding model.

In particular, for a time characteristic in the past, an embodiment uses, as the training corpus, textual summaries of comparable multimedia content having that time characteristic. For example, if a time characteristic of an adjustment specification is to adjust the content to the 1970s, comparable content also having a time characteristic of the 1970s, would be used.

If the time characteristic is in the future, or comparable content for a time characteristic in the past is unavailable or insufficient, an embodiment uses, as a base for a training corpus, textual summaries of comparable multimedia content having a present-day or past time characteristic. An embodiment divides content, or portions of the content, in the corpus into temporal portions. A temporal portion includes narrative text within a set of time markers in the content, e.g. between minute 5 and minute 10. An embodiment determines a frequency for units of narrative text in each of the temporal portions, constructs a set of time series of the frequencies, and uses the time series to project the set of units of narrative text into the future or past, to a time specified by the time characteristic. An embodiment uses the projected corpus to train the embedding model, using a presently-available embedding model training technique.

If a time characteristic of an adjustment specification is the present day, an embodiment need not train an embedding model, but instead configures and uses a model already trained on a contemporary corpus of text. Some non-limiting examples of pretrained and fine-tuned models include Word2vec and related models, and GloVe.

An embodiment generates a set of styles. A style is a modified version of a video frame of one of the comparable multimedia contents, and serves as an example of what video content should look like after adjustment.

To generate a style, an embodiment starts with a video frame extracted from comparable multimedia content. In particular, an embodiment partitions comparable video content into scenes by analyzing the content and identifying cuts (transitions from one video scene to another), then selecting at least one video from one or more scenes. One embodiment selects a frame just before a cut. Another embodiment selects a frame just after a cut. Another embodiment selects a frame just before and just after a cut. Another embodiment selects a frame midway between two cuts. Another embodiment selects a frame at a random position between two cuts. Other frame selection methods are also possible and contemplated within the scope of the illustrative embodiments.

An embodiment performs sentiment analysis on a video frame extracted from comparable multimedia content. To perform sentiment analysis on the frame, an embodiment uses a presently-available object recognition technique to identify one or more subjects of the video frame. Some non-limiting examples of subjects of the video frame are objects visible in the frame (e.g., a frame depicting a kitchen scene might have cabinets, a countertop, a stove, refrigerator, and a table and chairs), a location (e.g. a frame depicting an object recognized as the Eiffel Tower is in Paris), and weather (e.g. a frame depicting an outdoor scene might be sunny or cloudy).

An embodiment searches, within the comparable multimedia content or within information from a different source, for interactions and comments relating to an identified subject. An embodiment performs sentiment analysis on the interactions and comments, using any presently-known sentiment analysis technique. For example, a simple sentiment analysis technique classifies the polarity of a given text, i.e. whether the expressed opinion in the content positive, negative, or neutral. As another example, a more detailed sentiment classification includes classifications such as angry, sad, and happy. Thus, if an example video frame depicts a kitchen scene including a black countertop, and an embodiment finds an interaction in which the parties agree that black is too dark for a countertop, the embodiment might conclude, using sentiment analysis, that these users have a negative sentiment towards black countertops.

In addition, if a time characteristic of the adjustment specification is in the past or future, an embodiment performs sentiment analysis on interactions and comments relating to an identified subject at particular times, constructs a time series of the sentiment towards the object, and uses the time series to predict the sentiment at a time specified by the time characteristic. For example, if an example video frame depicts a kitchen scene including a black countertop, and a time series of sentiment towards black countertops is currently trending more negatively, an embodiment might predict that in five years, sentiment towards black countertops will be more negative than it is at present.

An embodiment uses a word embedding model to convert a current or predicted sentiment to a vector. An embodiment applies both the vector and the video frame extracted from comparable multimedia content to the inputs of a style adjustment model, and executes the style adjustment model to modify the video frame. The modification adjusts the video frame to be more within the context and style of the predicted sentiment The adjusted video frame is now a style, and usable as a model with which to adjust other video content to be adjusted.

In one embodiment, the style adjustment model is implemented using a convolutional neural network (CNN). CNNs process two-dimensional images (such as individual still images or individual video frames) as volumes, receiving a color image as a rectangular box where the width and height are measured by the number of pixels associated with each dimension, and the depth is measured by the number of colors (e.g. in an three-color system, red, green, and blue, the depth is three). Thus, stacked two-dimensional matrices make up the image volume and form the initial data that is fed to into the convolutional network. The network then filters the image by grouping squares of pixels together. CNNs are defined by a set of hyperparameters. Some non-limiting examples of CNN hyperparameters are filter size, stride, padding, and dilation rate. Filter size is the size of each group of pixels—for example, 3×3 or 5×5. Stride determines the filter's amount of movement over the image or video. For example, if a neural network's stride is set to 1, the filter will move one pixel, or unit, at a time. Padding is added to the boundary of the image to allow for more space for the filter to cover the image. Dilation factor adds gaps to each filter. For example, for a two-dimensional input image, a dilation rate of one has no gaps, a dilation rate of two has a one pixel gap between each input, and a dilation rate of four has a three pixel gap between each input. An embodiment sets hyperparameters for the CNN used for style adjustment using the user's technical profile. In particular, an embodiment uses regression techniques that use polynomial based models to correlate a user's technical profile (e.g. device parameters such as dots per inch (DPI) and resolution) to CNN hyperparameters.

Before an embodiment can use the style adjustment model, the model must first be trained. To train the style adjustment model, an embodiment uses a training set in which human experts have labelled, or annotated, historical data. Then an embodiment executes the trained style adjustment model to modify an input video frame, adjusting the video frame to be within the style and context of the sentiment. An embodiment saves the adjusted video frame as a style, usable as a model with which to adjust other video content to be adjusted. An embodiment repeats the style generation process for additional video frames, creating a set of styles.

An embodiment selects one or more styles from the set of styles according to the adjustment specification, and uses a frame adjustment model and the style to adjust a video frame of the multimedia content. In one embodiment, the frame adjustment model is implemented using a CNN, with hyperparameters set according to the user's technical profile, and trained using a training set. An embodiment uses training set data collected from users' devices and video content displayed on the devices. and a presently-available training technique. In one embodiment, the frame adjustment model is the same as the style adjustment model.

To adjust a video frame of the multimedia content, an embodiment interlaces the video frame with a style video frame. Interlacing the two video frames combines the two frames into one using every other pixel of each frame. For example, starting from the top left corner, the first row of the resulting image might consist of the top left pixel from one frame, the next pixel from the second frame, the next pixel from the first frame, and so on, and then starting the second row with the row's leftmost pixel from the second frame.

An embodiment applies the interlaced video frame to the frame adjustment model and executes the frame adjustment model, adjusting the video frame to be closer to the adjustment specification exemplified by the style.

To adjust text of the multimedia content, an embodiment uses the configured and trained embedding model as an input into deep learning models with stacked encoders and decoders to generate modified text.

To adjust audio of the multimedia content, an embodiment converts the audio to a narrative text form, using any presently-available audio-to-text conversion technique. An embodiment uses the configured and trained embedding model to generate modified text from the text converted from audio. An embodiment converts the modified text back to an audio form, using any presently-available text-to-audio conversion technique, then applies a portion of the audio to an audio adjustment model and executes the audio adjustment model, adjusting the audio portion to be closer to the adjustment specification. In one embodiment, the audio adjustment model is implemented using a CNN, with hyperparameters set according to the user's technical profile, and trained using a training set and a presently-available training technique. An embodiment uses training set data collected from users' devices and audio content played on the devices.

Once an embodiment has adjusted any audio portions, video frames, and textual components of the input multimedia content, the embodiment synchronizes the adjusted video and audio, and places the adjusted text appropriately. The result is an adjusted multimedia content, adjusted according to the adjustment specification, using comparable content as models for the adjustment.

The manner of multimedia content adjustment using comparable content described herein is unavailable in the presently available methods in the technological field of endeavor pertaining to multimedia content adjustment. A method of an embodiment described herein, when implemented to execute on a device or data processing system, comprises substantial advancement of the functionality of that device or data processing system in matching, within a tolerance, multimedia content to be adjusted to a set of comparable media contents, using the set of comparable media contents to configure and train an embedding model, using the trained embedding model to generate a set of styles, adjusting audio and video frames of the multimedia content using the trained embedding model and set of styles, and synchronizing the adjusted audio and video to produce multimedia content adjusted according to the adjustment characteristic.

The illustrative embodiments are described with respect to certain types of contents, video frames, audio portions, embeddings, adjustments, adjustment models, conversions, tolerances, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
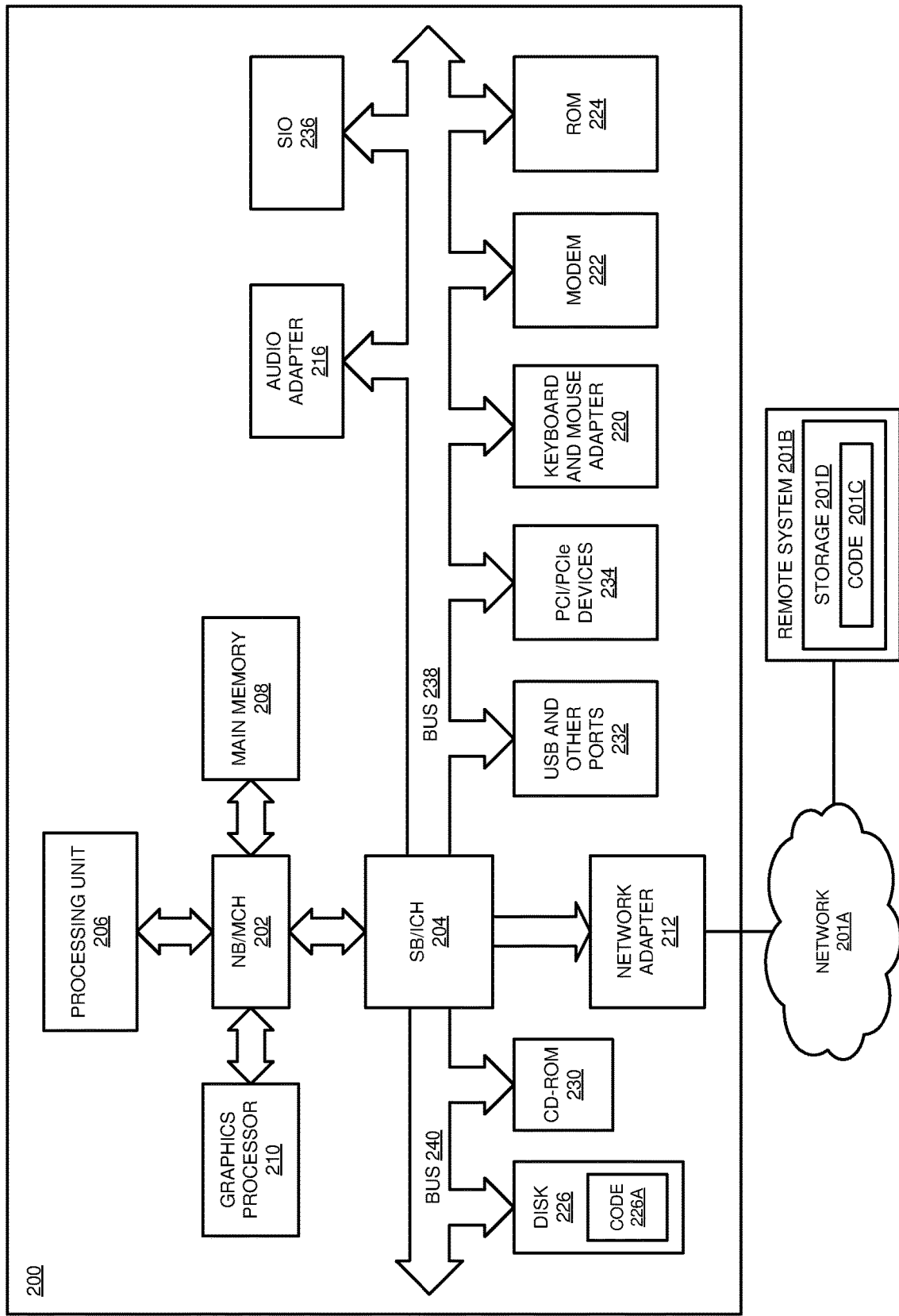
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
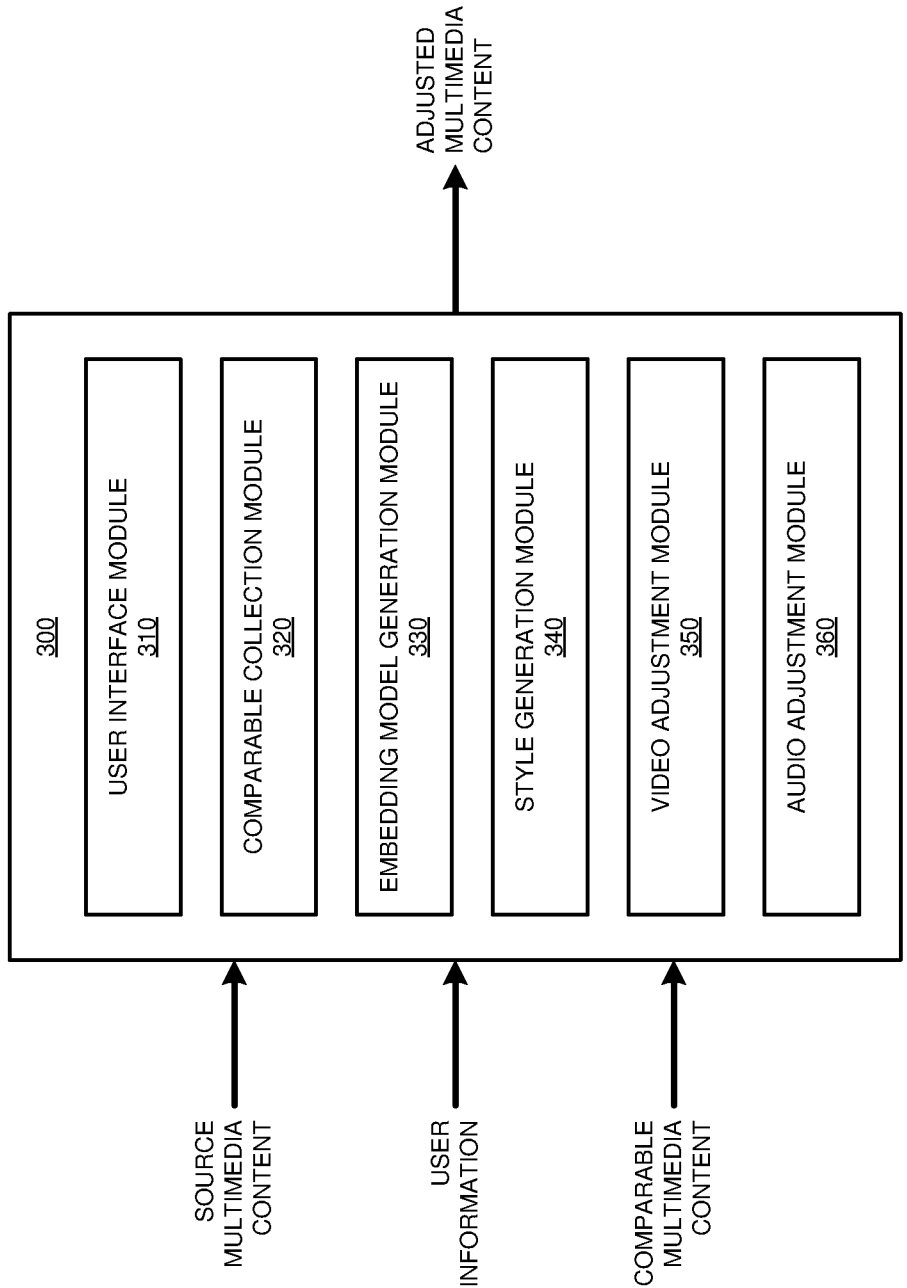
FIG. 3 depicts a block diagram of an example configuration for multimedia content adjustment using comparable content in accordance with an illustrative embodiment.

With reference to FIG. 3, this figure depicts a block diagram of an example configuration for multimedia content adjustment using comparable content in accordance with an illustrative embodiment. Application 300 is an example of application 105 in FIG. 1 and executes in any of servers 104 and 106, clients 110, 112, and 114, and device 132 in FIG. 1.

User interface module 310 receives multimedia content to be adjusted and loads the multimedia content into memory. The multimedia content includes one or more of a still image or video component, an audio component, and a textual component. Module 310 receives a user query and converts the query to an adjustment specification specifying an adjustment to be made to the content. The adjustment specification includes a time characteristic to which the multimedia content is to be adjusted. In implementations of module 310, the time characteristic specifies a date or range of dates, and can be in the past, present, or future. In one implementation of module 310, the adjustment specification includes a format characteristic to which the multimedia content is to be adjusted. In another implementation of module 310, the adjustment specification includes a style characteristic to which the multimedia content is to be adjusted. As well, module 310 maintains technical and preference profiles corresponding to a user.

Comparable collection module 320 identifies a set of comparable multimedia content, and obtains the content from any available source. Using the set of comparable content provides application 300 with examples of the results of content adjustments. Module 320 also generates a textual summary of a piece of the comparable content, using any presently-available content summarization technique.

Embedding model generation module 330 configures and trains an embedding model, or configures an already-trained embedding model for use. For a time characteristic in the past, module 330 uses, as the training corpus, textual summaries of comparable multimedia content having that time characteristic. If the time characteristic is in the future, or comparable content for a time characteristic in the past is unavailable or insufficient, module 330 uses, as a base for a training corpus, textual summaries of comparable multimedia content having a present-day or past time characteristic and projects units of narrative text into the future or past, to a time specified by the time characteristic. Module 330 uses the projected corpus to train the embedding model, using a presently-available embedding model training technique. If a time characteristic of an adjustment specification is the present day, module 330 need not train an embedding model, but instead configures and uses a model already trained on a contemporary corpus of text.

Style generation module 340 generates a set of styles. A style is a modified version of a video frame of one of the comparable multimedia contents, and serves as an example of what video content should look like after adjustment. To generate a style, module 340 starts with a video frame extracted from comparable multimedia content, and uses a presently-available object recognition technique to identify one or more subjects of the video frame. Module 340 searches, within the comparable multimedia content or within information from a different source, for interactions and comments relating to an identified subject, and performs sentiment analysis on the interactions and comments, using any presently-known sentiment analysis technique. In addition, if a time characteristic of the adjustment specification is in the past or future, module 340 performs sentiment analysis on interactions and comments relating to an identified subject at particular times, constructs a time series of the sentiment towards the object, and uses the time series to predict the sentiment at a time specified by the time characteristic. Module 340 uses a word embedding model to convert a current or predicted sentiment to a vector. Module 340 applies both the vector and the video frame extracted from comparable multimedia content to the inputs of a style adjustment model, and executes the style adjustment model to modify the video frame. The modification adjusts the video frame to be closer to the current or predicted sentiment. The adjusted video frame is now a style, and usable as a model with which to adjust other video content to be adjusted. Module 340 repeats the style generation process for additional video frames, creating a set of styles.

Video adjustment module 350 selects one or more styles from the set of styles according to the adjustment specification, and uses a frame adjustment model and the style to adjust a video frame of the multimedia content. More detail of module 350 is provided with reference to FIG. 8.

To adjust audio of the multimedia content, audio adjustment module 360 converts the audio to a narrative text form, uses the configured and trained embedding model to generate modified text from the text converted from audio, and converts the modified text back to an audio form. Module 360 then applies a portion of the audio to an audio adjustment model and executes the audio adjustment model, adjusting the audio portion to be closer to the adjustment specification.

To adjust text of the multimedia content, application 300 uses the configured and trained embedding model to generate modified text. Once application 300 has adjusted any audio portions, video frames, and textual components of the input multimedia content, the application synchronizes the adjusted video and audio, and places the adjusted text appropriately. The result is an adjusted multimedia content, adjusted according to the adjustment specification, using comparable content as models for the adjustment.

Figure 4:
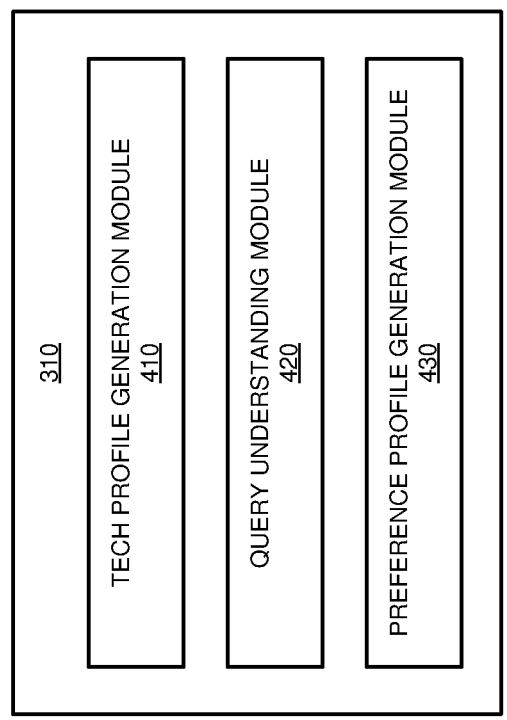
FIG. 4 depicts a block diagram of an example configuration for multimedia content adjustment using comparable content in accordance with an illustrative embodiment.

With reference to FIG. 4, this figure depicts a block diagram of an example configuration for multimedia content adjustment using comparable content in accordance with an illustrative embodiment. In particular, FIG. 4 depicts more detail of module 310 in FIG. 3.

Technical profile generation module 410 maintains a technical profile corresponding to the user. The technical profile includes information about characteristics of a device intended to present the adjusted multimedia content. Module 410 encodes the technical profile into a vector. In one implementation of module 410, each vector component is a floating point number between zero and 1. Preference profile generation module 430 maintains preference information corresponding to the user.

Query understanding module 420 receives a query from a user and converts the query to an adjustment specification specifying an adjustment to be made to the content. One implementation of module 420 provides a user interface with which a user constructs a standardized form of a query which module 420 converts to an adjustment specification. In another implementation of module 420, a user supplies the query in natural language form, and module 420 uses one or more presently-available natural language processing or natural language understanding techniques to convert the natural language of the query to an adjustment specification. Another implementation of module 420 does not require a query, and instead determines an adjustment by analyzing multimedia content. For example, an implementation of module 420 analyzes a multimedia content, determines that the content is video frames in greyscale, that the user's technical profile includes a system capable of displaying color video, and that the user's preference information indicates that the user has previously colorized other video content, and constructs an adjustment specification specifying that this content should be colorized as well.

Figure 5:
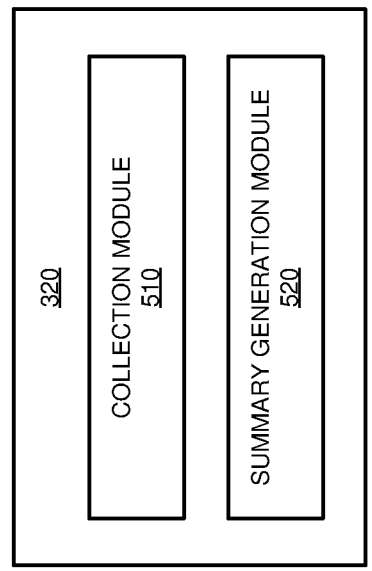
FIG. 5 depicts a block diagram of an example configuration for multimedia content adjustment using comparable content in accordance with an illustrative embodiment.

With reference to FIG. 5, this figure depicts a block diagram of an example configuration for multimedia content adjustment using comparable content in accordance with an illustrative embodiment. In particular, FIG. 5 depicts more detail of module 320 in FIG. 3.

Collection module 510 identifies a set of comparable multimedia content, and obtains the comparable content from any available source. One implementation of module 510 includes a stored library of content for use as comparable content. Another implementation of module 510 searches external sources accessible via a network such as the Internet for comparable content. Another implementation of module 510 obtains comparable content from another source or using another presently-available technique. Summary generation module 520 generates a textual summary of a piece of the comparable content, using any presently-available content summarization technique.

Figure 6:
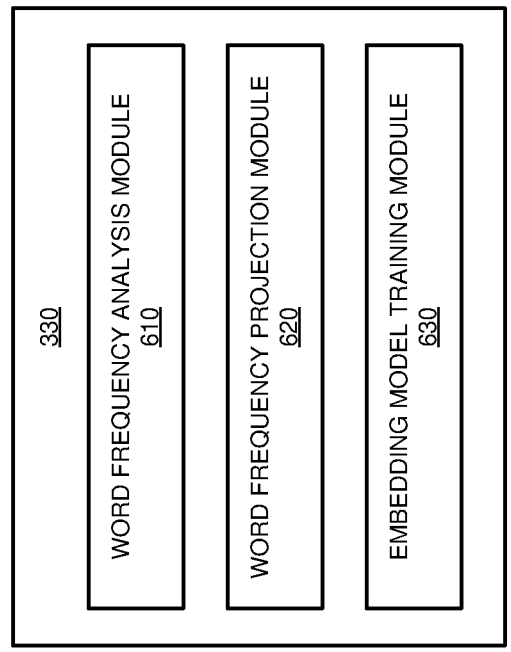
FIG. 6 depicts a block diagram of an example configuration for multimedia content adjustment using comparable content in accordance with an illustrative embodiment.

With reference to FIG. 6, this figure depicts a block diagram of an example configuration for multimedia content adjustment using comparable content in accordance with an illustrative embodiment. In particular, FIG. 6 depicts more detail of module 330 in FIG. 3.

In particular, if the time characteristic is in the future, or comparable content for a time characteristic in the past is unavailable or insufficient, word frequency analysis module 610 divides content in the corpus into portions and determines a frequency for units of narrative text in each of the portions. Word frequency projection module 620 constructs a set of time series of the frequencies, and uses the time series to project the set of units of narrative text into the future or past, to a time specified by the time characteristic. Embedding model training module 630 uses the projected corpus, or if available, textual summaries of comparable multimedia content having a time characteristic in the past, to train the embedding model, using a presently-available embedding model training technique.

Figure 7:
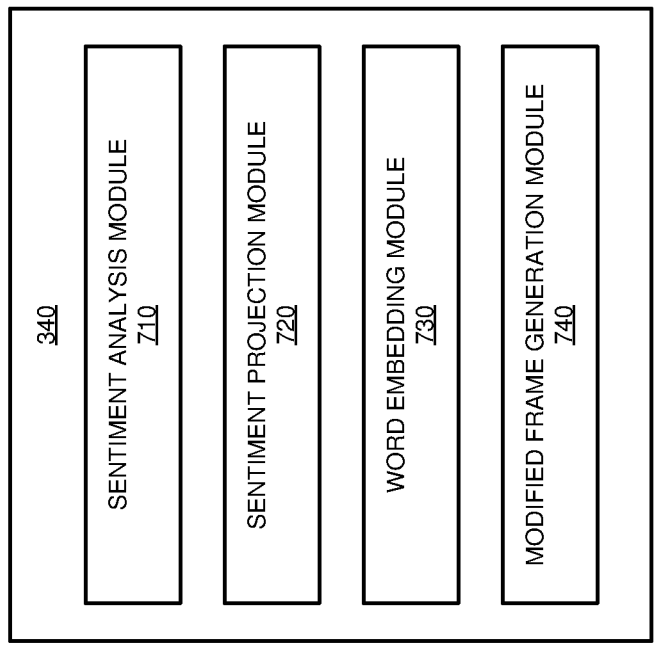
FIG. 7 depicts a block diagram of an example configuration for multimedia content adjustment using comparable content in accordance with an illustrative embodiment.

With reference to FIG. 7, this figure depicts a block diagram of an example configuration for multimedia content adjustment using comparable content in accordance with an illustrative embodiment. In particular, FIG. 7 depicts more detail of module 340 in FIG. 3.

To generate a style, sentiment analysis module 710 partitions comparable video content into scenes by analyzing the content and identifying cuts (transitions from one video scene to another), then selecting at least one video from one or more scenes. One implementation of module 710 selects a frame just before a cut. Another implementation of module 710 selects a frame just after a cut. Another implementation of module 710 selects a frame just before and just after a cut. Another implementation of module 710 selects a frame midway between two cuts. Another implementation of module 710 selects a frame at a random position between two cuts.

Module 710 uses a presently-available object recognition technique to identify one or more subjects in the extracted video frame. Module 710 searches, within the comparable multimedia content or within information from a different source, for interactions and comments relating to an identified subject. Module 710 performs sentiment analysis on the interactions and comments, using any presently-known sentiment analysis technique. For example, a simple sentiment analysis technique classifies the polarity of a given text, i.e. whether the expressed opinion in the content positive, negative, or neutral. As another example, a more detailed sentiment classification includes classifications such as angry, sad, and happy. Thus, if an example video frame depicts a kitchen scene including a black countertop, and an embodiment finds an interaction in which the parties agree that black is too dark for a countertop, the embodiment might conclude, using sentiment analysis, that these users have a negative sentiment towards black countertops.

In addition, if a time characteristic of the adjustment specification is in the past or future, sentiment projection module 720 performs sentiment analysis on interactions and comments relating to an identified subject at particular times, constructs a time series of the sentiment towards the object, and uses the time series to predict the sentiment at a time specified by the time characteristic. For example, if an example video frame depicts a kitchen scene including a black countertop, and a time series of sentiment towards black countertops is currently trending more negatively, an embodiment might predict that in five years, sentiment towards black countertops will be more negative than it is at present.

Word embedding module 730 uses a word embedding model to convert a current or predicted sentiment to a vector. Modified frame generation module 740 applies both the vector and the video frame extracted from comparable multimedia content to the inputs of a style adjustment model, and executes the style adjustment model to modify the video frame. The modification adjusts the video frame to be closer to the current or predicted sentiment. The adjusted video frame is now a style, and usable as a model with which to adjust other video content to be adjusted. In one implementation of module 740, the style adjustment model is implemented using a trained CNN, with hyperparameters set using the user's technical profile.

Figure 8:
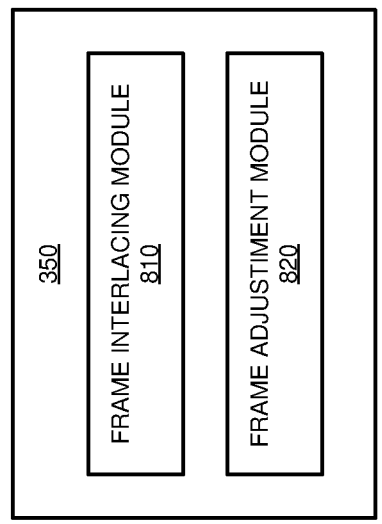
FIG. 8 depicts a block diagram of an example configuration for multimedia content adjustment using comparable content in accordance with an illustrative embodiment.

With reference to FIG. 8, this figure depicts a block diagram of an example configuration for multimedia content adjustment using comparable content in accordance with an illustrative embodiment. In particular, FIG. 8 depicts more detail of module 350 in FIG. 3.

To adjust a video frame of the multimedia content, frame interlacing module 810 interlaces a style video frame with a video frame of multimedia content to be adjusted. Interlacing the two video frames combines the two frames into one using every other pixel of each frame. For example, starting from the top left corner, the first row of the resulting image might consist of the top left pixel from one frame, the next pixel from the second frame, the next pixel from the first frame, and so on, and then starting the second row with the row's leftmost pixel from the second frame.

Frame adjustment module 820 applies the interlaced video frame to the frame adjustment model and executes the frame adjustment model, adjusting the video frame to be closer to the adjustment specification exemplified by the style. In one implementation of module 820, the frame adjustment model is implemented using a CNN, with hyperparameters set according to the user's technical profile, and trained using a training set and a presently-available training technique. In one implementation of module 820, the frame adjustment model is the same as the style adjustment model.

Figure 9:
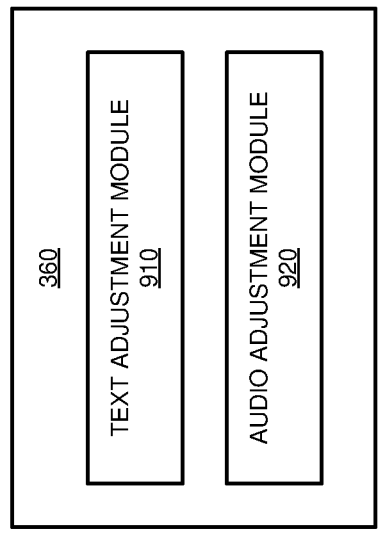
FIG. 9 depicts a block diagram of an example configuration for multimedia content adjustment using comparable content in accordance with an illustrative embodiment.

With reference to FIG. 9, this figure depicts a block diagram of an example configuration for multimedia content adjustment using comparable content in accordance with an illustrative embodiment. In particular, FIG. 9 depicts more detail of module 360 in FIG. 3.

To adjust audio of the multimedia content, text adjustment module 910 converts the audio to a narrative text form, using any presently-available audio-to-text conversion technique. Module 910 uses the configured and trained embedding model to generate modified text from the text converted from audio. Module 910 converts the modified text back to an audio form, using any presently-available text-to-audio conversion technique.

Audio adjustment module 920 executes an audio adjustment model, adjusting the modified audio portion to be closer to the adjustment specification. In one implementation of module 920, the audio adjustment model is implemented using a CNN, with hyperparameters set according to the user's technical profile, and trained using a training set and a presently-available training technique.

Figure 10:
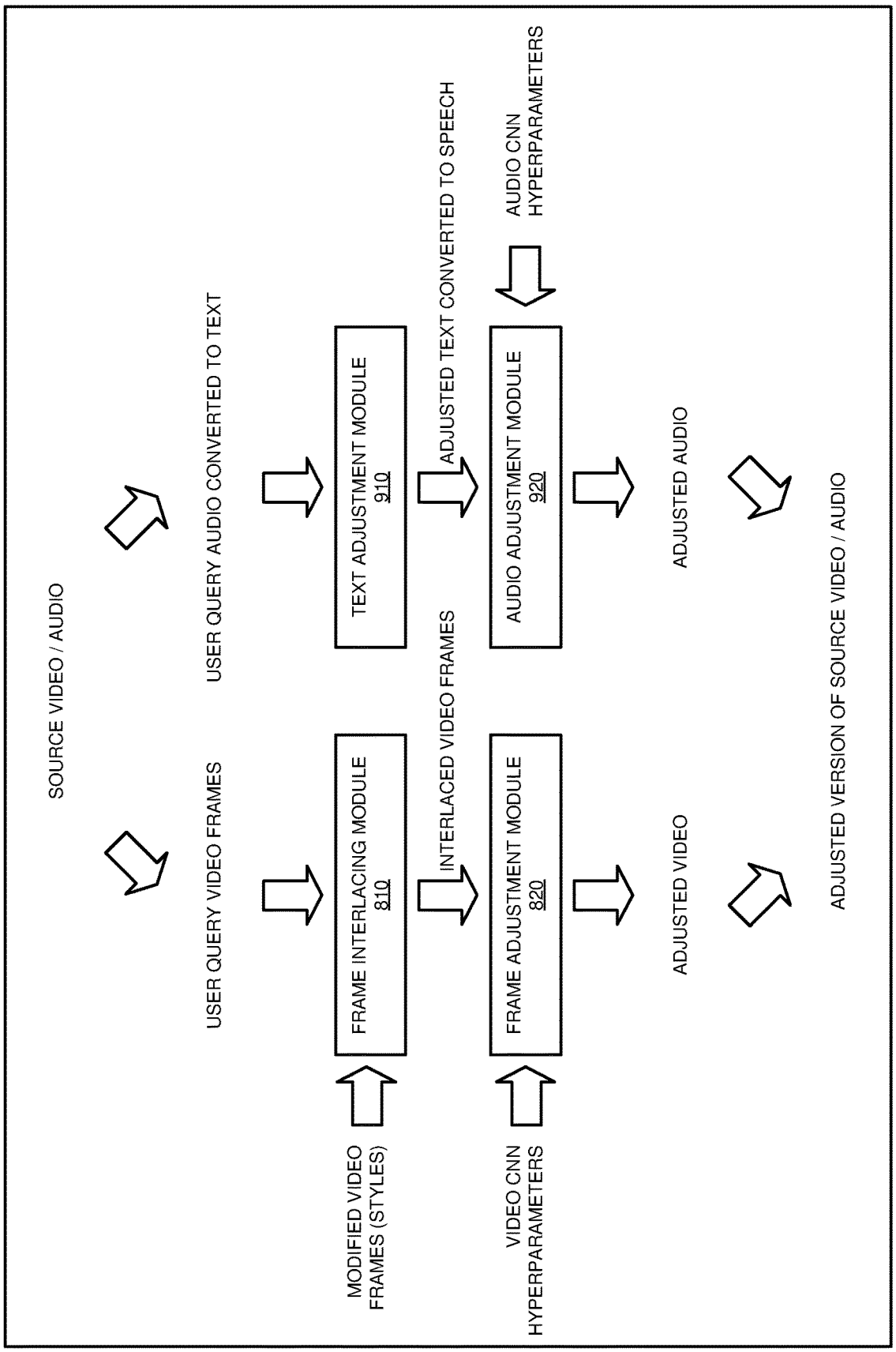
FIG. 10 depicts an example of multimedia content adjustment using comparable content in accordance with an illustrative embodiment.

With reference to FIG. 10, this figure depicts an example of multimedia content adjustment using comparable content in accordance with an illustrative embodiment. Frame interlacing module 810 and frame adjustment module 820 are the same as modules 810 and 820 in FIG. 8. Text adjustment module 910 and audio adjustment module 920 are the same as modules 910 and 920 in FIG. 9. The example can be executed using application 300 in FIG. 3.

The example begins with source audio and video of a multimedia content to be adjusted. To adjust a video frame, module 810 interlaces a video frame with a style video frame. Then module 820 applies the interlaced video frame to a frame adjustment model implemented as a CNN, with CNN hyperparameters set using the user's technical profile, Module 820 executes the frame adjustment model, adjusting the video frame to be closer to the adjustment specification exemplified by the style.

To adjust an audio portion of the multimedia content, an embodiment converts the audio to a narrative text form, then module 910 uses the configured and trained embedding model to generate modified text from the text converted from audio. An application converts the modified text back to an audio form, and applies the modified audio portion to an audio adjustment model implemented as a CNN, with CNN hyperparameters set using the user's technical profile, Module 920 executes the audio adjustment model, adjusting the audio portion to be closer to the adjustment specification Once the audio and video have been adjusted, an application synchronizes the adjusted video and audio. The result is an adjusted multimedia content, adjusted according to the adjustment specification, using comparable content as models for the adjustment.

Figure 11:
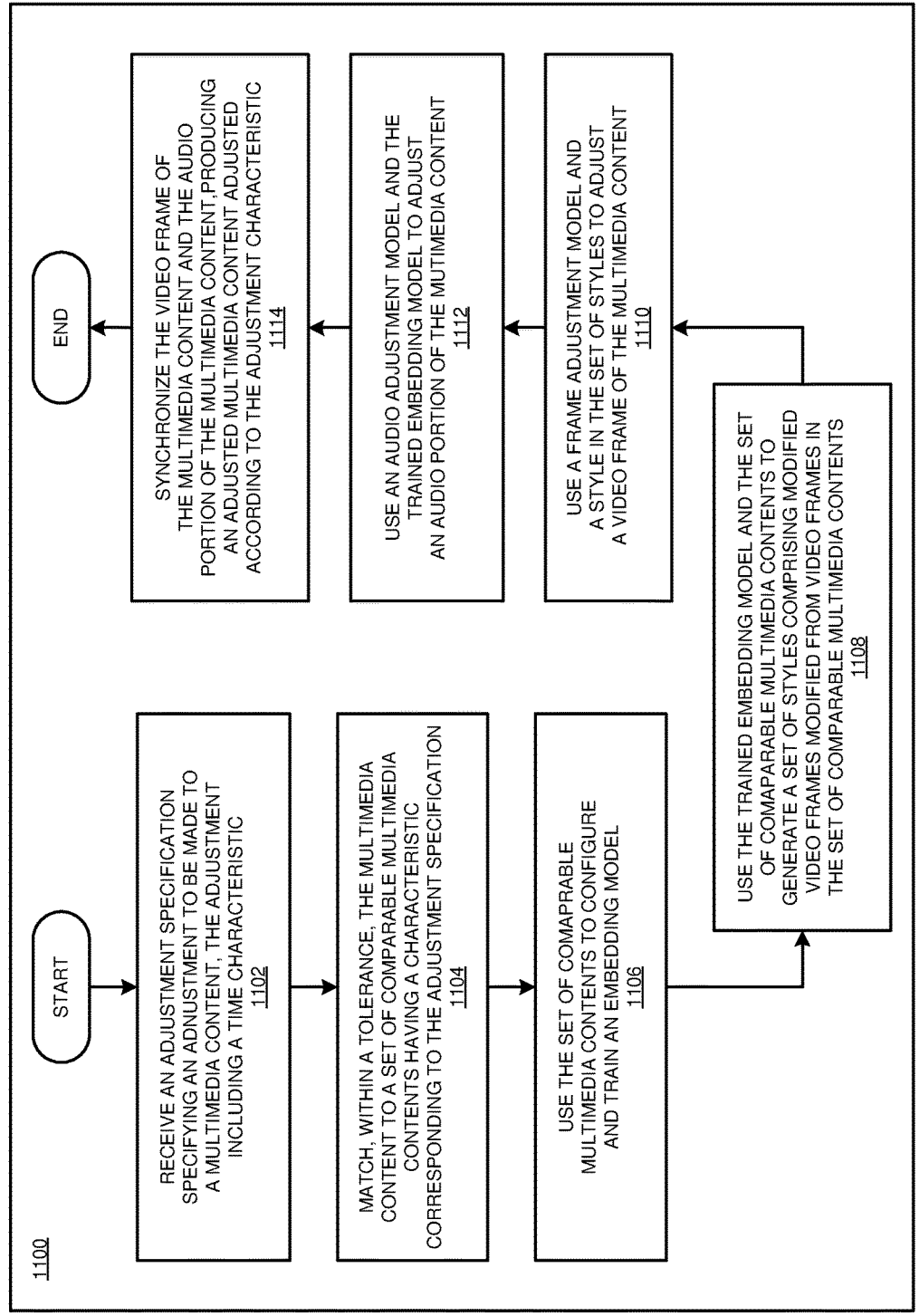
FIG. 11 depicts a flowchart of an example process for multimedia content adjustment using comparable content in accordance with an illustrative embodiment.

With reference to FIG. 11, this figure depicts a flowchart of an example process for multimedia content adjustment using comparable content in accordance with an illustrative embodiment. Process 1100 can be implemented in application 300 in FIG. 3.

In block 1102, the application receives an adjustment specification specifying an adjustment to be made to a multimedia content, the adjustment including a time characteristic. In block 1104, the application matches, within a tolerance, the multimedia content to a set of comparable multimedia contents having a characteristic corresponding to the adjustment specification. In block 1106, the application uses the set of comparable multimedia contents to configure and train an embedding model. In block 1108, the application uses the trained embedding model and the set of comparable multimedia contents to generate a set of styles comprising modified video frames modified from video frames in the set of comparable multimedia contents. In block 1110, the application uses a frame adjustment model and a style in the set of styles to adjust a video frame of the multimedia content. In block 1112, the application uses an audio adjustment model and the trained embedding model to adjust an audio portion of the multimedia content. In block 1114, the application synchronizes the video frame of the multimedia content and the audio portion of the multimedia content, producing an adjusted multimedia content adjusted according to the adjustment characteristic. Then the application ends.

Figure 12:
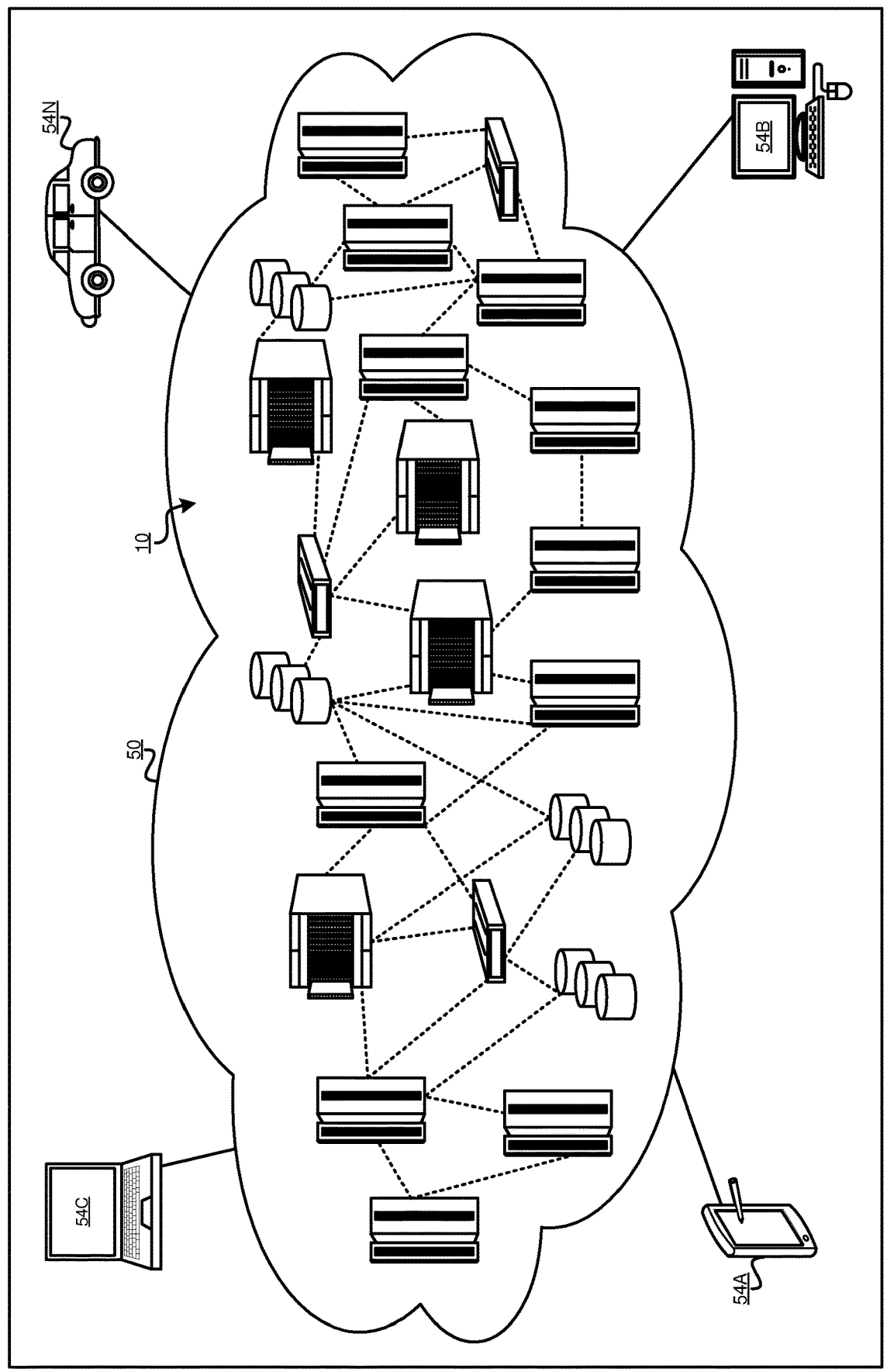
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
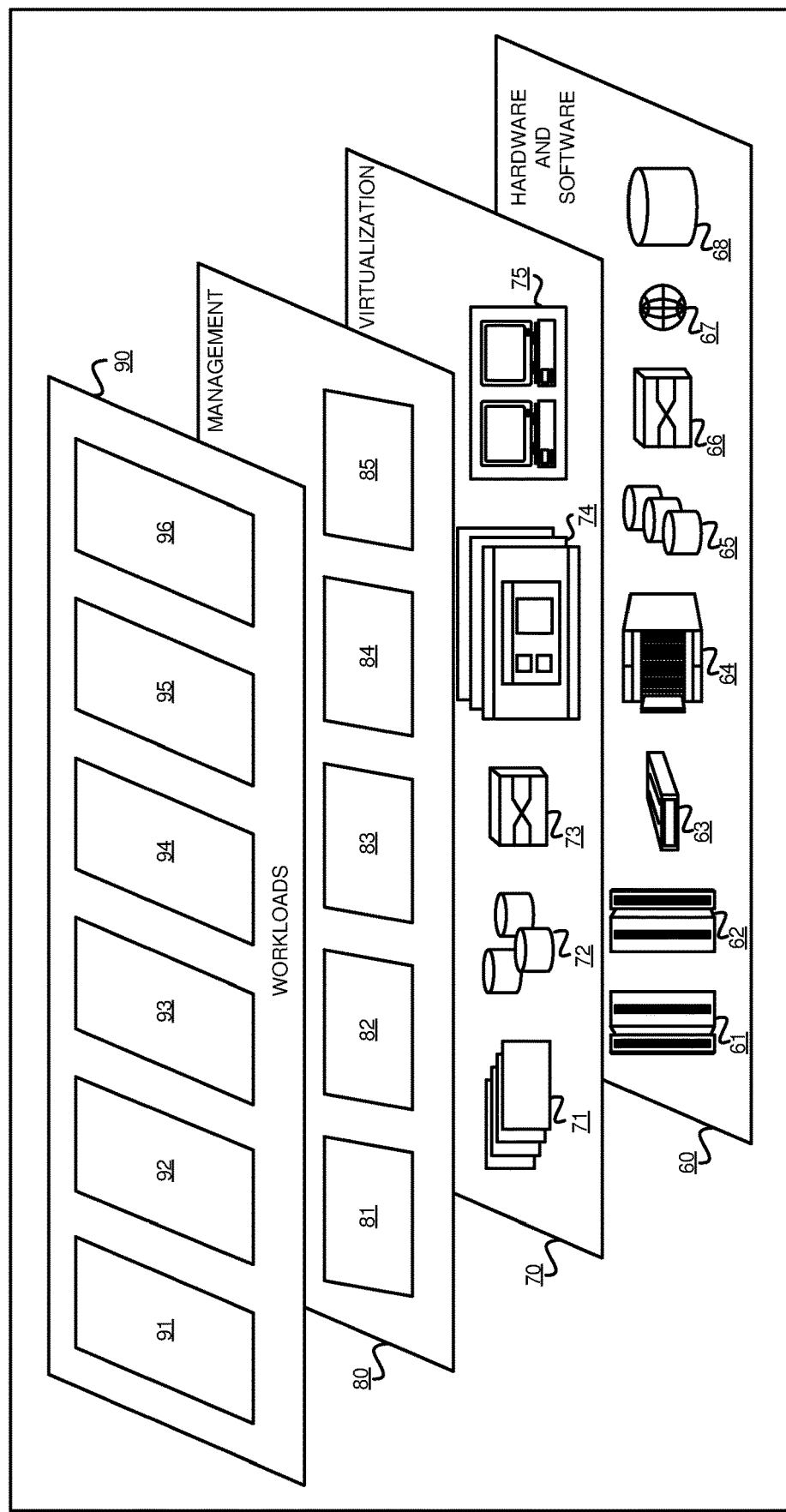
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for multimedia content adjustment using comparable content and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    loading into memory, as a part of adjusting a multimedia content, the multimedia content, wherein an adjustment specification specifies the adjustment, the adjustment comprising a time characteristic to which the multimedia content is to be adjusted;
    matching, within a tolerance, the multimedia content to a set of comparable multimedia contents, a comparable multimedia content in the set of comparable multimedia contents having a characteristic corresponding to the adjustment specification;
    configuring an embedding model, the embedding model comprising a conversion of a unit of narrative text into a numerical representation, the conversion encoding a contextual relationship between two units of narrative text into a distance between corresponding numerical representations;
    training, using the set of comparable multimedia contents, the embedding model;
    generating, as a result of executing a set of instructions in a processor, using the trained embedding model and the set of comparable multimedia contents, a set of styles, a style in the set of styles comprising a modified video frame, the modified video frame modified from a video frame in the set of comparable multimedia contents;
    adjusting, using a frame adjustment model and a style in the set of styles, a video frame of the multimedia content;
    adjusting, using an audio adjustment model and the trained embedding model, an audio portion of the multimedia content; and
    synchronizing the video frame of the multimedia content and the audio portion of the multimedia content, the synchronizing producing an adjusted multimedia content, the adjusted multimedia content adjusted according to the adjustment characteristic.

2. The computer-implemented method of claim 1, wherein training the embedding model comprises:
    generating, from a comparable multimedia content in the set of comparable media contents, a text document;
    constructing, from the text document, a set of word time series, a word time series in the set of word time series comprising a usage frequency of a word in the text document at a set of times;

predicting, using the set of word time series, a set of usage frequencies of words in the text document at a time specified by the time characteristic; and training, using the predicted set of usage frequencies, the embedding model.

3. The computer-implemented method of claim 1, wherein the adjustment comprises a style characteristic to which the multimedia content is to be adjusted.

4. The computer-implemented method of claim 3, wherein generating the style comprises:

identifying, by executing an object recognition model, a subject of the video frame;

determining, by executing a sentiment analysis model on the set of comparable multimedia contents, a sentiment value corresponding to the subject of the video frame and a time period associated with the sentiment value;

adjusting, using a sentiment time series constructed from the sentiment value and the time period, the sentiment value to a time specified by the time characteristic;

converting, by executing a second embedding model, the adjusted sentiment value to a sentiment vector, the sentiment vector comprising a numerical representation of the adjusted sentiment; and modifying, by executing a trained style adjustment model and using the sentiment vector, the video frame, the modified video frame adjusted according to the adjusted sentiment.

5. The computer-implemented method of claim 1, wherein the adjustment comprises a format characteristic to which the multimedia content is to be adjusted, the format characteristic comprising a format of the multimedia content.

6. The computer-implemented method of claim 5, wherein adjusting the video frame of the multimedia content comprises:

interlacing, producing a second video frame, a video frame of the multimedia content with a style in the set of styles;

generating, using the adjustment characteristic, the frame adjustment model, the generating comprising adjusting a parameter of the frame adjustment model according to the format characteristic; and adjusting, using the generated frame adjustment model, the video frame of the multimedia content.

7. The computer-implemented method of claim 5, wherein adjusting the audio portion of the multimedia content comprises:

generating, from the audio portion of the multimedia content using a speech conversion model, corresponding text;

adjusting, using the trained embedding model, the corresponding text;

generating, from the adjusted corresponding text, a second audio portion;

generating, using the adjustment characteristic, the audio adjustment model, the generating comprising adjusting a parameter of the audio adjustment model according to the format characteristic; and adjusting, using the generated audio adjustment model, the audio portion of the multimedia content, the adjusted audio combining the audio portion with the second audio portion.

8. The computer-implemented method of claim 1, wherein the text document comprises a text summary of the multimedia content.

9. The computer-implemented method of claim 1, wherein the text document comprises text in the multimedia content.

10. The computer-implemented method of claim 1, wherein the text document comprises speech in the multimedia content, the speech converted to text form using a speech conversion model.

11. A computer program product for multimedia content adjustment using comparable content, the computer program product comprising:

one or more computer readable storage media, and program instructions collectively stored on the one or more computer readable storage media, the program instructions comprising:

program instructions to load into memory, as a part of adjusting a multimedia content, the multimedia content, wherein an adjustment specification specifies the adjustment, the adjustment comprising a time characteristic to which the multimedia content is to be adjusted;

program instructions to match, within a tolerance, the multimedia content to a set of comparable multimedia contents, a comparable multimedia content in the set of comparable multimedia contents having a characteristic corresponding to the adjustment specification;

program instructions to configure an embedding model, the embedding model comprising a conversion of a unit of narrative text into a numerical representation, the conversion encoding a contextual relationship between two units of narrative text into a distance between corresponding numerical representations;

program instructions to train, using the set of comparable multimedia contents, the embedding model;

program instructions to generate, as a result of executing a set of instructions in a processor, using the trained embedding model and the set of comparable multimedia contents, a set of styles, a style in the set of styles comprising a modified video frame, the modified video frame modified from a video frame in the set of comparable multimedia contents;

program instructions to adjust, using a frame adjustment model and a style in the set of styles, a video frame of the multimedia content;

program instructions to adjust, using an audio adjustment model and the trained embedding model, an audio portion of the multimedia content; and program instructions to synchronize the video frame of the multimedia content and the audio portion of the multimedia content, the synchronizing producing an adjusted multimedia content, the adjusted multimedia content adjusted according to the adjustment characteristic.

12. The computer program product of claim 11, wherein program instructions to train the embedding model comprises:

program instructions to generate, from a comparable multimedia content in the set of comparable media contents, a text document;

program instructions to construct, from the text document, a set of word time series, a word time series in the set of word time series comprising a usage frequency of a word in the text document at a set of times;

program instructions to predict, using the set of word time series, a set of usage frequencies of words in the text document at a time specified by the time characteristic; and program instructions to train, using the predicted set of usage frequencies, the embedding model.

13. The computer program product of claim 11, wherein the adjustment comprises a style characteristic to which the multimedia content is to be adjusted.

14. The computer program product of claim 13, wherein program instructions to generate the style comprises:
program instructions to identify, by executing an object recognition model, a subject of the video frame;
program instructions to determine, by executing a sentiment analysis model on the set of comparable multimedia contents, a sentiment value corresponding to the subject of the video frame and a time period associated with the sentiment value;
program instructions to adjust, using a sentiment time series constructed from the sentiment value and the time period, the sentiment value to a time specified by the time characteristic;
program instructions to convert, by executing a second embedding model, the adjusted sentiment value to a sentiment vector, the sentiment vector comprising a numerical representation of the adjusted sentiment; and
program instructions to modify, by executing a trained style adjustment model and using the sentiment vector, the video frame, the modified video frame adjusted according to the adjusted sentiment.

15. The computer program product of claim 11, wherein the adjustment comprises a format characteristic to which the multimedia content is to be adjusted, the format characteristic comprising a format of the multimedia content.

16. The computer program product of claim 15, wherein program instructions to adjust the video frame of the multimedia content comprises:
program instructions to interlace, producing a second video frame, a video frame of the multimedia content with a style in the set of styles;
program instructions to generate, using the adjustment characteristic, the frame adjustment model, the generating comprising adjusting a parameter of the frame adjustment model according to the format characteristic; and
program instructions to adjust, using the generated frame adjustment model, the video frame of the multimedia content.

17. The computer program product of claim 11, wherein the stored program instructions are stored in the at least one of the one or more storage media of a local data processing system, and wherein the stored program instructions are transferred over a network from a remote data processing system.

18. The computer program product of claim 11, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 11, wherein the computer program product is provided as a service in a cloud environment.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to load into memory, as a part of adjusting a multimedia content, the multimedia content, wherein an adjustment specification specifies the adjustment, the adjustment comprising a time characteristic to which the multimedia content is to be adjusted;
program instructions to match, within a tolerance, the multimedia content to a set of comparable multimedia contents, a comparable multimedia content in the set of comparable multimedia contents having a characteristic corresponding to the adjustment specification;
program instructions to configure an embedding model, the embedding model comprising a conversion of a unit of narrative text into a numerical representation, the conversion encoding a contextual relationship between two units of narrative text into a distance between corresponding numerical representations;
program instructions to train, using the set of comparable multimedia contents, the embedding model;
program instructions to generate, as a result of executing a set of instructions in a processor, using the trained embedding model and the set of comparable multimedia contents, a set of styles, a style in the set of styles comprising a modified video frame, the modified video frame modified from a video frame in the set of comparable multimedia contents;
program instructions to adjust, using a frame adjustment model and a style in the set of styles, a video frame of the multimedia content;
program instructions to adjust, using an audio adjustment model and the trained embedding model, an audio portion of the multimedia content; and
program instructions to synchronize the video frame of the multimedia content and the audio portion of the multimedia content, the synchronizing producing an adjusted multimedia content, the adjusted multimedia content adjusted according to the adjustment characteristic.

* * * * *